(12) United States Patent
Sung et al.

(10) Patent No.: US 7,254,588 B2
(45) Date of Patent: Aug. 7, 2007

(54) DOCUMENT MANAGEMENT AND ACCESS CONTROL BY DOCUMENT'S ATTRIBUTES FOR DOCUMENT QUERY SYSTEM

(75) Inventors: Feng-Kuang Sung, Hsinchu (TW); John Kao, Kaohsiung (TW); Ching-Chung Chang, Hsinchu (TW); Cheng-Hui Chiu, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 493 days.

(21) Appl. No.: 10/831,898

(22) Filed: Apr. 26, 2004

(65) Prior Publication Data
US 2005/0240572 A1    Oct. 27, 2005

(51) Int. Cl.
G06F 17/30 (2006.01)
G06F 7/00 (2006.01)

(52) U.S. Cl. .................. 707/104.1; 707/102; 707/205; 707/3

(58) Field of Classification Search ................ 707/102, 707/3, 104.1, 205; 705/2; 715/513
See application file for complete search history.

(56) References Cited

U.S. PATENT DOCUMENTS

| | | | |
|---|---|---|---|
| 4,633,430 A | 12/1986 | Cooper | |
| 4,897,780 A | 1/1990 | Lakness | |
| 4,996,662 A | 2/1991 | Cooper et al. | |
| 5,943,670 A | 8/1999 | Prager | |
| 6,038,560 A | 3/2000 | Wical | |
| 6,061,697 A * | 5/2000 | Nakao | 715/513 |
| 6,324,551 B1 | 11/2001 | Lamping et al. | |
| 6,385,619 B1 | 5/2002 | Eichstaedt et al. | |
| 6,393,427 B1 | 5/2002 | Vu et al. | |
| 6,421,691 B1 | 7/2002 | Kajitani | |
| 6,449,598 B1 * | 9/2002 | Green et al. | 705/2 |
| 7,155,504 B1 * | 12/2006 | Fujieda | 709/224 |
| 7,181,445 B2 * | 2/2007 | Bebo et al. | 707/3 |
| 2004/0187075 A1 * | 9/2004 | Maxham et al. | 715/511 |
| 2005/0055337 A1 * | 3/2005 | Bebo et al. | 707/3 |

* cited by examiner

Primary Examiner—John Cottingham
Assistant Examiner—Kuen S. Lu
(74) Attorney, Agent, or Firm—Haynes and Boone, LLP

(57) ABSTRACT

A document management system generates a hierarchical category tree itemizing documents within a database from associated attributes of the documents. The document management system further provides access privileges to the documents itemized in the hierarchical category tree by associating access privileges to the attributes of the documents with itemized by the hierarchical category tree.

8 Claims, 5 Drawing Sheets

DOCUMENT MANAGEMENT AND ACCESS CONTROL BY DOCUMENT'S ATTRIBUTES FOR DOCUMENT QUERY SYSTEM

BACKGROUND OF THE INVENTION

1. Field of the Invention

This invention relates generally to systems and methods for management of documents retained within a database. More particularly, this invention relates to systems and methods for the management of the categorization of documents retained within a database. Further, this invention relates to systems and methods for controlling permissions for accessing documents retained within a database based on the categories of these documents.

2. Description of Related Art

Documentation databases are well known in the art and are used to provide information to a user. An example of such a database would be the descriptions of the technology and process for fabricating integrated circuits. In semiconductor foundries and "fab-less" integrated circuit manufacturers, the foundry must maintain complete descriptions of the technologies such that the "fab-less" integrated circuit manufacturer can design an integrated circuit, simulate the design to verify its function, and technology rules necessary to create the masks for fabricating the integrated circuit. A semiconductor foundry has the capability for fabricating many types of integrated circuits and therefore must maintain the complete documentation for each of the process technologies for the types of integrated circuits.

As the process has become more automated, the documents are now maintained as records within a database. With the advent of programming languages such as Extensible Markup Language (XML), the database for the documents no longer contains just the text, diagrams, and information for the formatting of the document for printing. The database now maintains records describing a documentation number, version level, an amount of time for which the document is to be effective, a document status, and a storage location of the document. In programming languages such as XML this information is recorded as tags that maybe embedded within the text of the document. Further, the database may have information describing certain attributes of the document. In the example of the documents of a silicon foundry, the attributes may be a document type such as bond pad rules, cell layout, noise model and a general description of each of the technologies of the silicon foundry for which the document pertains. Other attributes may include tags identifying applicable technologies, circuit types for the technology, and release status.

Organization and categorization of the documents to permit access to the document by a user is generally through a hierarchical document category tree. Differing attributes are chosen for the various levels of the hierarchical document category tree. Traditionally, access for the documents is granted or denied at the nodes of the tree.

For a more complete discussion of the structure and operation of the document management system of the prior art refer now to FIG. 1. The document database 5 contains the document bodies 10. The document bodies 10 are the textual information providing the detailed information of the document. The document basic information records 15 provides the information describing the document such as the document number, the document version, document phase of creation, the document title, the effective duration for which the document is considered valid, the current status of the document, and the physical location within the database 5 of the document bodies 10. In document databases using programming languages such as XML, the document basic information 15 maybe appended to the document bodies as XML tags. Alternately, the document basic information 15 maybe recorded in a separate file with the document location acting as a pointer to the document body 10.

Attributes 20 of the document are associated with the document basic information again either as tags as in XML implementations or as separate file records having a pointer within the document basic information records 15. The attributes categorize the document according to certain characteristics such as document type 22, application 24, technology 26, and release type 28. For instance in the silicon foundry, the document type 22 would be documents that describe the bond pad rules, the cell layout, noise model, or any general document providing description of the document. The application 24 for the silicon foundry would be, for instance, logic, Bi-CMOS, a single transistor random access memory, or other documents describing the general technology. The technology attribute 26 describes the minimum feature size the identifies a technology in this example 0.13 µm, 0.15 µm, 0.18 µm. The release type 28 for this example is whether the technology is in development, is in manufacturing but not totally accepted for general use, or released for general application.

An administrator in charge of document database management must create a hierarchical category tree 30 defining a structure for categorizing the document of the database. Refer to FIG. 2 for a discussion of the decision process in constructing the hierarchical document category tree 30. The administrator determines the categories of documents within the document database 5. One category is the foundry design documents 31 that detail the device and cell layouts, circuit structure, feature geometry. The potential subcategories are attributes that are associated with each document such as the document type 22, application 24, technology 26, and release type 28.

Returning to FIG. 1, the administrator then manually creates the category tree 30. In the example of the document database 5 for a silicon foundry, the categories of the category tree would include for example the foundry design documents 31, the technology files 33 detailing the process rules for the technology, the mask related documents 35 describing the masking structure and layers, the yield improvement documents 37 describing the necessary design considerations to provide the levels of yield desired by a customer, the quality and reliability documents 39 describing the yield statistics and reliability equations to determine failure rates of fabricated integrated circuits. The administrator then creates the levels of the hierarchical category tree 30. For the example of the foundry design documents 31, the second level would be the application 40, the third level would be the technology 45 available for each application, and the fourth level would be types of documents 50 available each of the technologies. The administrator then sets the privilege access control for each node 55 and 60 of the hierarchical category tree 30 so that a user may gain access to the documents within the document database 5. The user must navigate the hierarchical category tree 30 to find a desired document.

Since the administrator must create the hierarchical category tree 30, each new document or creation of a new type of category requires a manual reconstruction of the hierarchical category tree 30. When the hierarchical category tree 30 is changed, the privilege access control for each node 55 and 60 must be recreated. The hierarchical category tree 30 is structured as a file containing the identifications for each of the document within the database 5. These identifications act as attachment points for the documents and must be recreated with each change to the hierarchical category tree 30. The document attributes 20 have no relationship to the structure of the hierarchical category tree 30. Further, since the construction and management of the hierarchical category tree 30 is a manual process there is a high risk that documents may be associated with the wrong nodes of the hierarchical category tree 30.

U.S. Pat. No. 6,393,427 (Vu, et al.) describes a method for constructing and maintaining a navigation tree based on external document classifiers. A navigation tree is constructed by taking usability and user preferences into consideration based on the returned category labels from the classifiers. Control parameters and algorithms are provided for inserting into and deleting documents from the navigation tree, and for splitting and merging nodes of the navigation tree.

U.S. Pat. No. 6,385,619 (Eichstaedt, et al.) teaches a system that generates user interest profiles by monitoring and analyzing a user's access to a variety of hierarchical levels within a set of structured documents, e.g., documents available at a web site. Each information document has parts associated with it and the documents are classified into categories using a known taxonomy. The user interest profiles are automatically generated based on the type of content viewed by the user. The type of content is determined by the text within the parts of the documents viewed and the classifications of the documents viewed. In addition, the profiles also are generated based on other factors including the frequency and currency of visits to documents having a given classification, and/or the hierarchical depth of the levels or parts of the documents viewed. User profiles include an interest category code and an interest score to indicate a level of interest in a particular category. The profiles are updated automatically to accurately reflect the current interests of an individual, as well as past interests. A time-dependent decay factor is applied to the past interests. The system presents to the user documents or references to documents that match the current profile.

U.S. Pat. No. 6,324,551 (Lamping, et al.) illustrates a document management system which organizes, stores, and retrieves documents in accordance with document properties. A property attachment mechanism allows a user to define and attach static properties and/or active properties to a document. The active properties include executable code which controls the behavior of the document contents. Upon transferring a document to another user, system, or environment, the document management system combines the document content and properties as a self-contained document which can interpret and manipulate its own contents. In this manner, a receiving user does not require additional applications in order to manipulate the document contents into a usable format. The self-contained document interprets and manipulates itself using its active properties to provide a useful document to the receiving user.

U.S. Pat. No. 6,038,560 (Wical) describes a knowledge base search and retrieval system, which includes factual knowledge base queries and concept knowledge base queries. A knowledge base stores associations among terminology/categories that have a lexical, semantic or usage association. Document theme vectors identify the content of documents through themes as well as through classification of the documents in categories that reflects what the documents are primarily about. The factual knowledge base queries identify, in response to an input query, documents relevant to the input query through expansion of the query terms as well as through expansion of themes. The concept knowledge base query does not identify specific documents in response to a query, but specifies terminology that identifies the potential existence of documents in a particular area.

U.S. Pat. No. 5,943,670 (Prager) teaches a system and method for determining whether the best category for an object under investigation is a mixture of preexisting categories, and how the mixture is constituted. The system suggests the need for new categories, and for a fixed set of categories. The system then determines whether a document should be assigned to multiple categories. The system stores extra information in a category index for the determination of mixed categories.

U.S. Pat. No. 4,996,662 (Cooper, et al.) illustrates a document processing system including a control structure having separated supervisory and document functions. The document functions, including a document buffer and document access control means are the sole means for accessing documents and the document function routines are selected from predetermined library of such routines. The system includes a flexible, expandable document structure incorporating information item blocks and indexing blocks related through pointers and means for applying visual and informational attributes to document text.

U.S. Pat. No. 4,897,780 (Lakness) describes a document manager system for allocating storage locations and generating corresponding control blocks for active documents in response to requests from active tasks. The document manager controls the loading into memory from mass storage, such as a disk, a document file in disk file format. The loaded document file is stored in memory in document structure format for subsequent access thereto by a task, such as an application program. The loading of the document file into memory may be initiated by a task, either as a result of a user command or as a result of the operation of the task itself. In response to a request to load a document file, the document manager makes a request of a memory manager unit for an assignment of memory space to store the document file. After storage of the document file within the assigned memory space the document manager generates within the memory a document control block descriptive of various parameters associated with the loaded document. The document manager subsequently writes the location within memory of the generated document control block into an assigned location within the task requesting access to the document file. The requesting task is thereby enabled to gain access to the loaded document file.

U.S. Pat. No. 4,633,430 (Cooper) teaches a document processing system that includes a control structure having separated supervisory and document functions. The document functions, including a document buffer and document access controller are the sole means for accessing documents and the document function routines are selected from predetermined library of such routines. The system includes a flexible, expandable document structure incorporating information item blocks and indexing blocks related through pointers and means for applying visual and informational attributes to document text.

U.S. Pat. No. 6,421,691 (Kajitani) provides a document management system, which can display documents under management without the user having to be conscious of the data structure of the documents generated during the course of transactions. The system also provides a recording medium storing a decision making program which can display application documents under management without the user having to be conscious of the data structure of the application documents generated during the course of decision making transactions. The system includes a management information generator for generating management information used to manage a plurality of documents; a storage device for relating the plurality of documents with the management information generated by the management information generator and storing the related documents and management information; and a display that allows selection of one of the documents based on the management information stored in the storage device, and for displays the selected document in a display format as defined by the instruction data contained in that document.

SUMMARY OF THE INVENTION

An object of this invention is to provide document management system where a hierarchical category tree itemizing documents within a document database is generated from associated attributes of the documents.

Another object of this invention is to provide access privileges to the documents itemized in the hierarchical category tree by associating access privileges to the attributes of the documents with itemized by the hierarchical category tree.

To accomplish at least one of these objects, a document management system includes a document database retention device that contains the document database and a document database control system to automatically generate a hierarchical category tree from the attributes of the documents retained within the database. The document database retention device contains body text for each of documents within the document database, a document identification record associated with each of the document, at least one document attribute record for each document. The document database further retains an attribute tree level record providing a hierarchical categorization for each attribute and a document access control record associated with each document of the plurality of documents identifying which of the document attributes govern access to the documents.

The document database control system is in communication with the document database to generate a document tree categorizing the documents based on properties of the attributes of each of the documents of the database and the attribute tree level record. The document database control system is, further, in communication with a user to transfer those documents selected by the user from the document tree and for which the user has access privileges granted based on contents of the document access control record.

The document database control system creates a user access profile for the user, the user access profile defining access privileges for each attribute of each of the plurality of documents. The document database control system compares the user access profile to the document access control record to determine that those documents selected by the user are transferable to the user. The user may modify the hierarchical categorization of any attribute and the document database control system retains a modified attribute tree level record within the user access profile established for the user.

DETAILED DESCRIPTION OF THE INVENTION

An administrator of a document database management system of this invention receives a document for placement within the database. The administrator or the originator of the document creates a set of attributes that are associated with the document. A category tree level record enumerating a location within a hierarchical category tree for the attribute of the document is created for each of the attributes. Further each tree level record and its associated attribute has an access privilege record denoting a type of user that is to be granted access privileges for the document. The document with the attributes, category tree level record, and the access privilege record are placed within the database.

The administrator selects the attributes for the documents that are to be set to each level of a hierarchical category tree. The database management system then generates a hierarchical category tree based on the attributes of the documents within the database. The category tree then contains necessary pointers to the documents for retrieval.

A customer or user of the document database provides a profile of the types of attributes that are being sought in the database. The user assigned an access privilege coding which is associated with each attribute that the user desires. The user then displays the hierarchical category tree and selects the type of attribute for the documents that is to be selected. The database management system compares the access privilege record associated with the attribute and if the user is to be allowed access, the access is granted and the user can retrieve the document.

Figure 1:
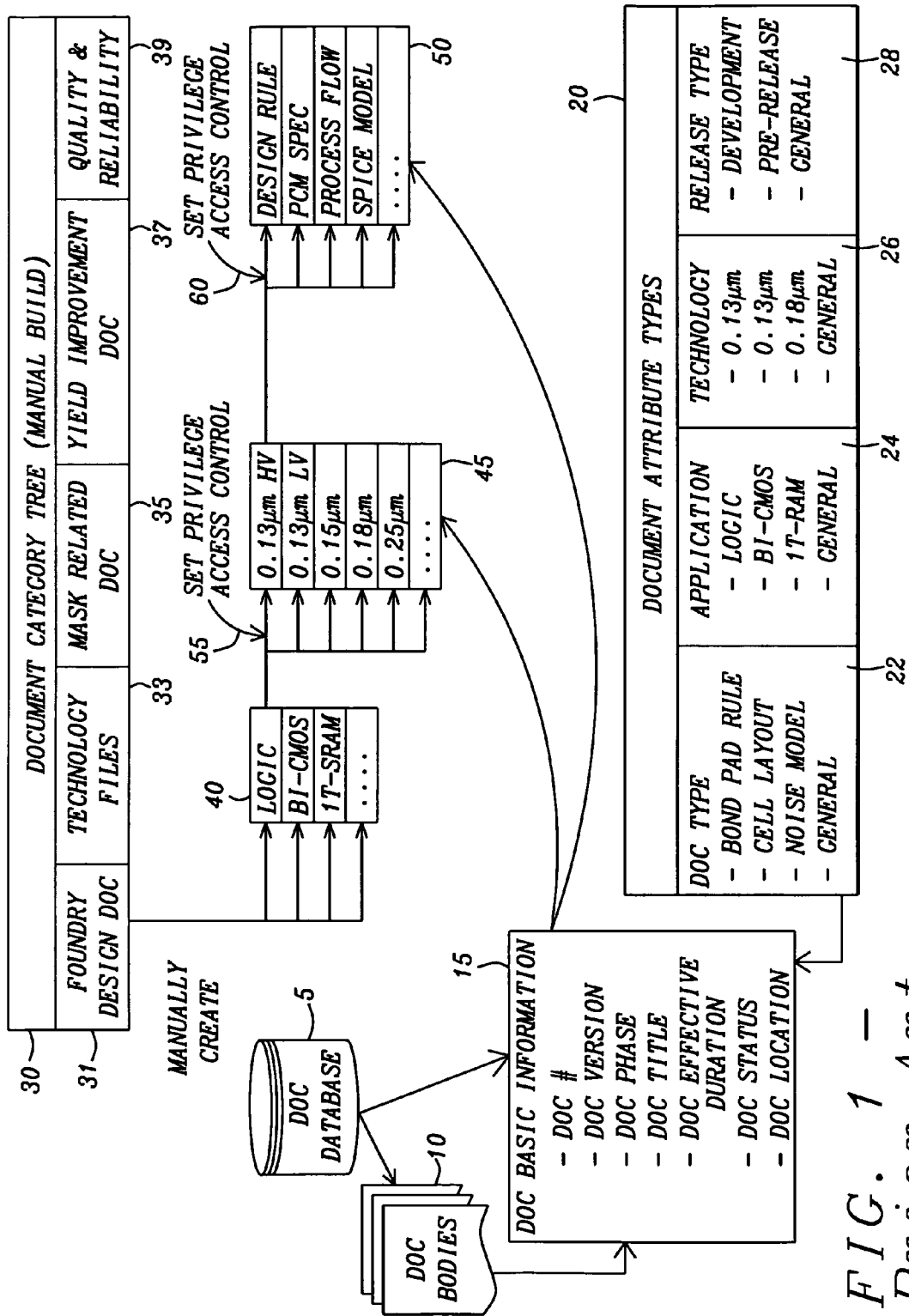
FIG. 1 is a diagram of a document management system illustrating the manual structure for forming a hierarchical category tree of the prior art.
Figure 2:
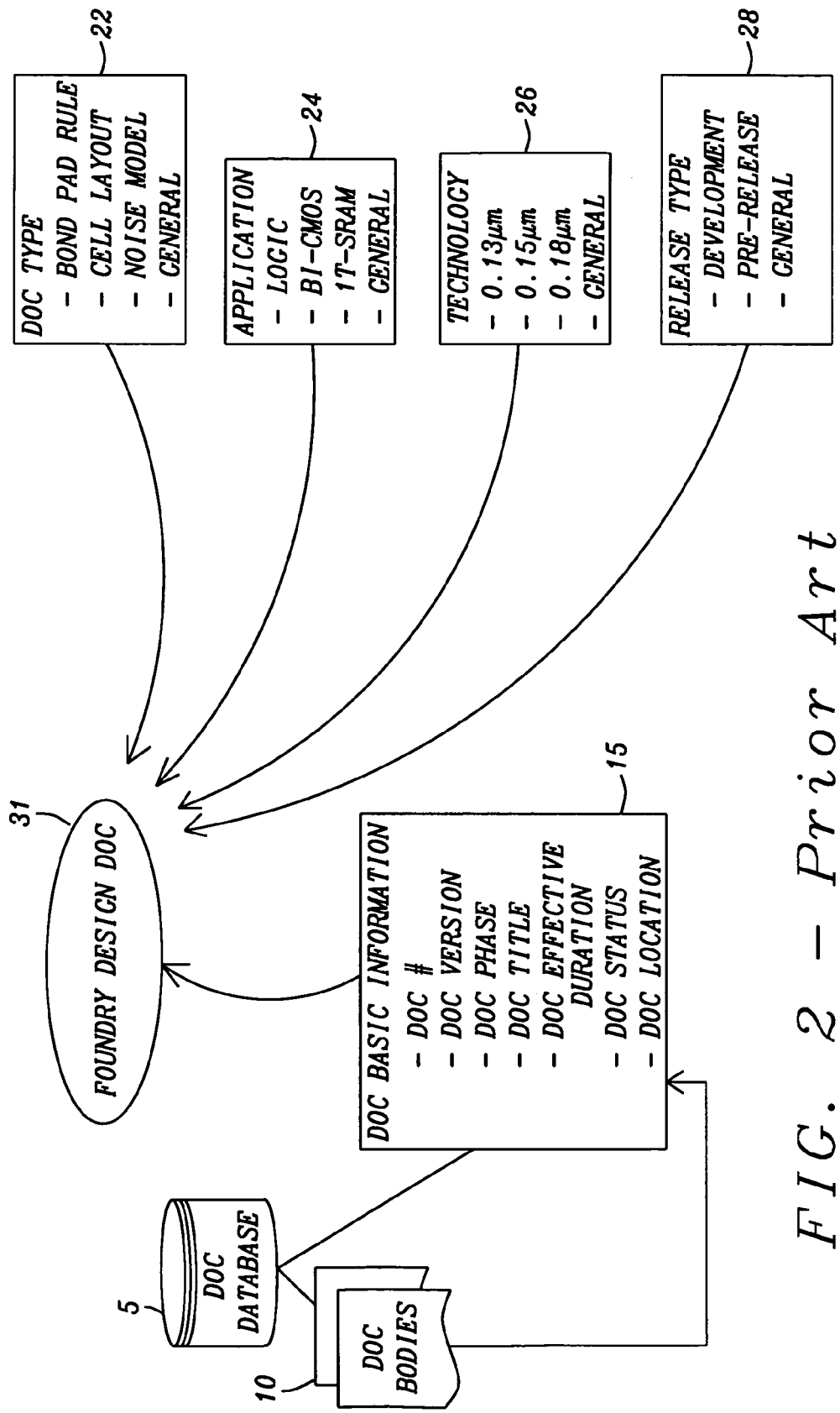
FIG. 2 is a diagram of the structure of a hierarchical category tree of the prior art.
Figure 3:
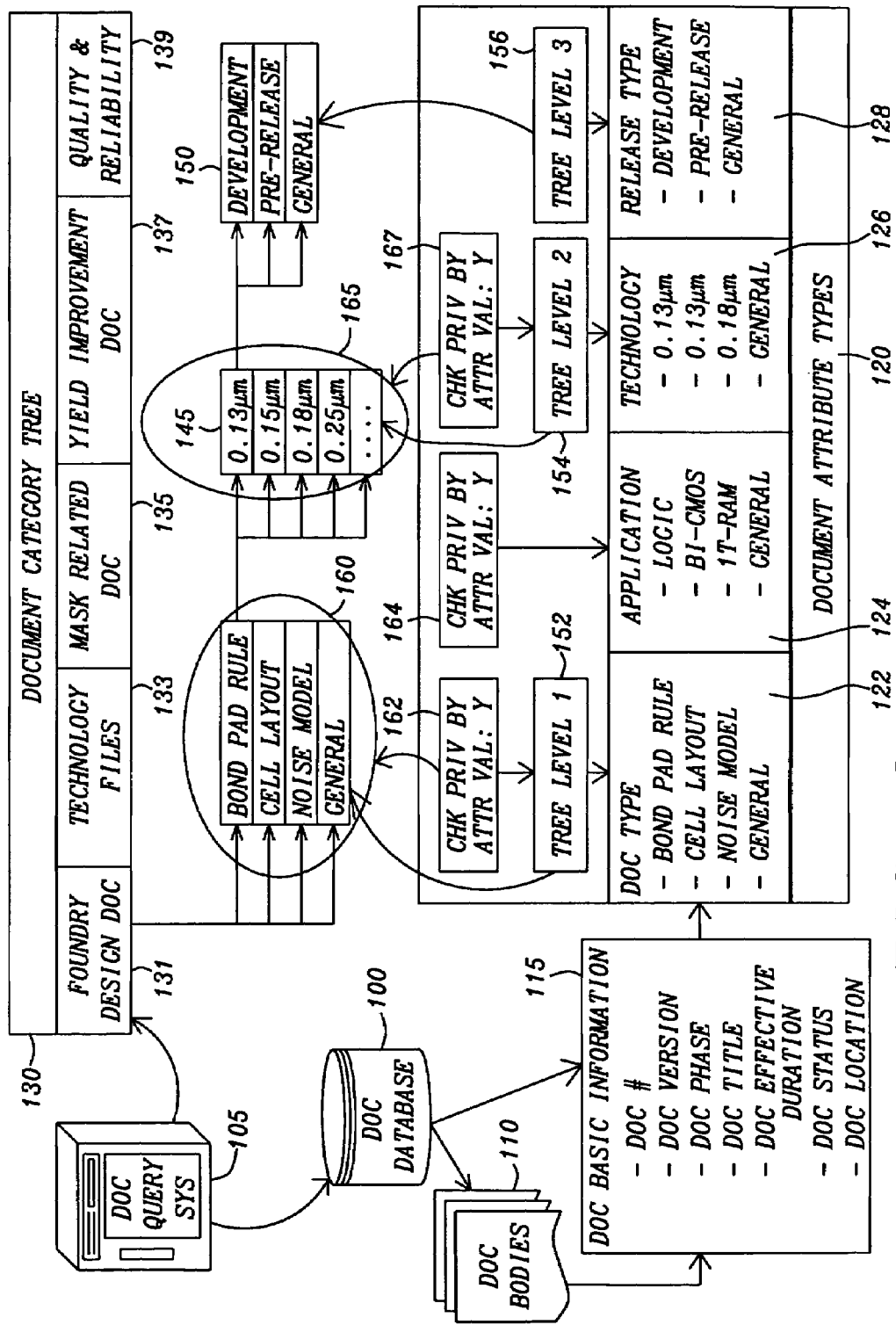
FIG. 3 is a diagram of a document management system illustrating an automatic structure for forming a hierarchical category tree based on document attributes and granting or denying access privileges to a user of this invention.

Refer now to FIG. 3 for a more detailed explanation of the structure and function of the document management system of this invention. The document query system 105 is generally a computer system that executes a database program for receiving, processing, and transferring documents to a document database retention device 100. The document database retention device 100 contains the document bodies 110. The document bodies 110 are the textual information providing the detailed information of the document. The document basic information records 115 provides the information describing the document such as the document number, the document version, document phase of creation, the document title, the effective duration for which the document is considered valid, the current status of the document, and the physical location within the database retention device 100 of the document bodies 110. In document database systems using programming languages such as XML, the document basic information 115 maybe appended to the document bodies as XML tags. Alternately, the document basic information 115 maybe recorded in a separate file with the document location acting as a pointer to the document body 110.

Attributes 120 of the document are associated with the document basic information again either as tags as in XML implementations or as separate file records having a pointer within the document basic information records 115. The attributes 120 categorize the document according to certain characteristics such as document type 122, application 124, technology 126, and release type 128. For instance in the silicon foundry, the document type 122 would be documents that describe the bond pad rules, the cell layout, noise model, or any general document providing description of the document. The application 124 for the silicon foundry would be, for instance, logic, Bi-CMOS, a single transistor random access memory, or other documents describing the general technology. The technology attribute 126 describes the minimum feature size the identifies a technology in this example 0.13 µm, 0.15 µm, 0.18 µm. The release type 128 for this example is whether the technology is in development, is in manufacturing but not totally accepted for general use, or release for general application.

The document query system 105 is in communication with a user through a network connection (i.e. Internet or Intranet) (not shown) or a terminal or even a display and keyboard. When a user accesses the document query system 105, the user either develops or transfers a profile defining the categories and attributes of documents that the user would like to select. The user is also assigned appropriate access privileges for those attributes that the user is seeking to select. The access privileges are appended to the user's profile which is retained by the document query system 105. The document query system 105 is then instructed to generate a document category tree 130. The categories, in the example of the silicon foundry, include the foundry design documents 131, the technology files 133 detailing the process rules for the technology, the mask related documents 135 describing the masking structure and layers, the yield improvement documents 137 describing the necessary design considerations to provide the levels of yield desired by a customer, the quality and reliability documents 139 describing the yield statistics and reliability equations to determine failure rates of fabricated integrated circuits.

The document query system 105 then accesses the user's profile to determine the attributes of the documents required by the user. The document query system 105 then generates a document category tree 130 based on the attributes 120 and tree level record 152, 154, and 156 that match the attributes and levels defined in the user's profile. These attributes then become the levels of the hierarchical category tree. For the example of the foundry design documents 131 are the first level, the second level would be the application 140, the third level would be the technology 145 available for each application, and the fourth level would be types of documents 150 available each of the technologies.

The document query system then compares the assigned access privilege levels of the user's profile to the access privilege record 162, 164, and 167 assigned to each attribute for a given associated tree level. If a given tree level has fundamentally open access or upper levels of the hierarchical category tree provide sufficient access protection, there may be no access privilege record as for the attribute 128 and the tree level 156.

In the example shown, the document type 122 becomes the first tree level under the category foundry design document 131 as shown in the tree level record 152. Similarly, technology attribute 126 is the second tree level 145 under the first tree level 140 according the tree level record 154 and the release type attribute 128 becomes the third tree level 150 under the second tree level 145 according to the tree level record 156. The application attribute 124 is assigned no tree level and therefore is not included in the hierarchical category tree 130 in the classification of the document.

Upon presentation of the hierarchical document category tree 130 to the user, the user will select one of the attribute designations for examination. For example, at the first level 140 the user may select the document type as the bond pad rule document. The document query system then compares the privilege access from the user's profile to the privilege access record 152 associated with the document type attribute 122. If the privilege access grants the user access, the privilege 160 is granted and the user may now select one attribute type of the second tree level 145. The document query system then compares the privilege access from the user's profile to the privilege access record 154 associated with the technology type attribute 126. If the privilege access grants the user access, the privilege 165 is granted and the user may now select one attribute type of the third tree level 150. There is universal privilege access at this level and the user may access any of the attribute types. The document query system 105 then displays the available documents for the user to access for retrieval from the document database 100.

Further, the user's profile optionally may contain modifications of the tree level records 152, 154, and 156, thus allowing the user to define the structure of the hierarchical document category tree 130. The document query system 105 examines the user's profile for the modification of the tree level records 152, 154, and 156, when it is constructing the hierarchical document category tree 130. The document query system 105 constructs the hierarchical document category tree 130 giving those modifications priority.

It is well known in the art that while the above describes a document database management system of this invention that generates a hierarchical category tree itemizing documents within a database from associated attributes of the documents and provides access privileges to the documents itemized in the hierarchical category tree by associating access privileges to the attributes of the documents with itemized by the hierarchical category tree, the document database management may be implemented as a program process defined in program code for execution on a computing system. The program code maybe retained on media such as storage nodes of the cluster network or the global communication network, or stored on storage media such a read only memory (ROM), a magnetic disk, or an optical disk. The program code executed by the computing system implements the method that generates a hierarchical category tree itemizing documents within a database from associated attributes of the documents and provides access privileges to the documents by associating access privileges to the attributes of the documents with itemized by the hierarchical category tree as shown in FIGS. 4 and 5.

Figure 4:
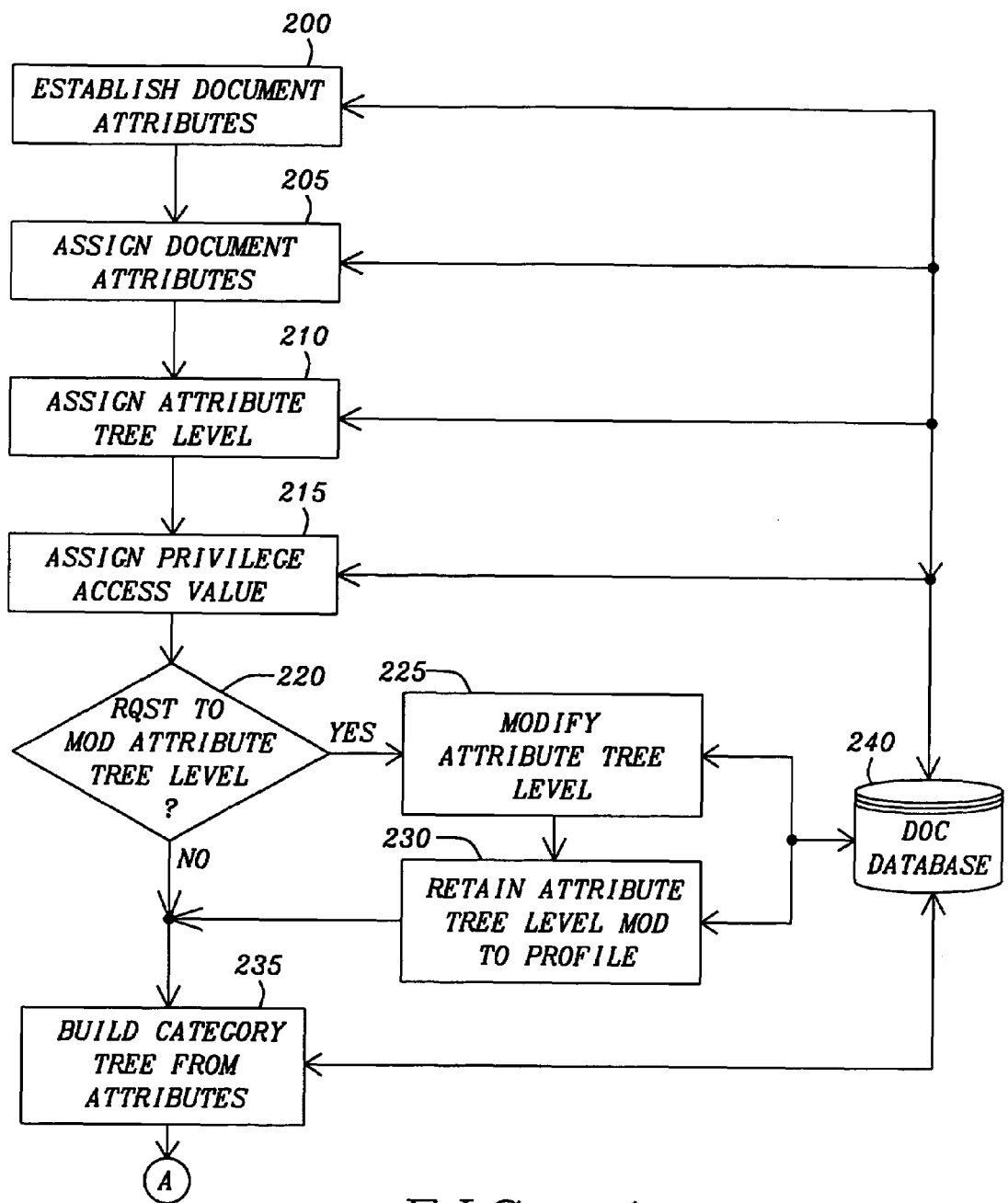
FIG. 4 is a process flow diagram for document database management illustrating the automatic forming of a hierarchical category tree of this invention.
Figure 5:
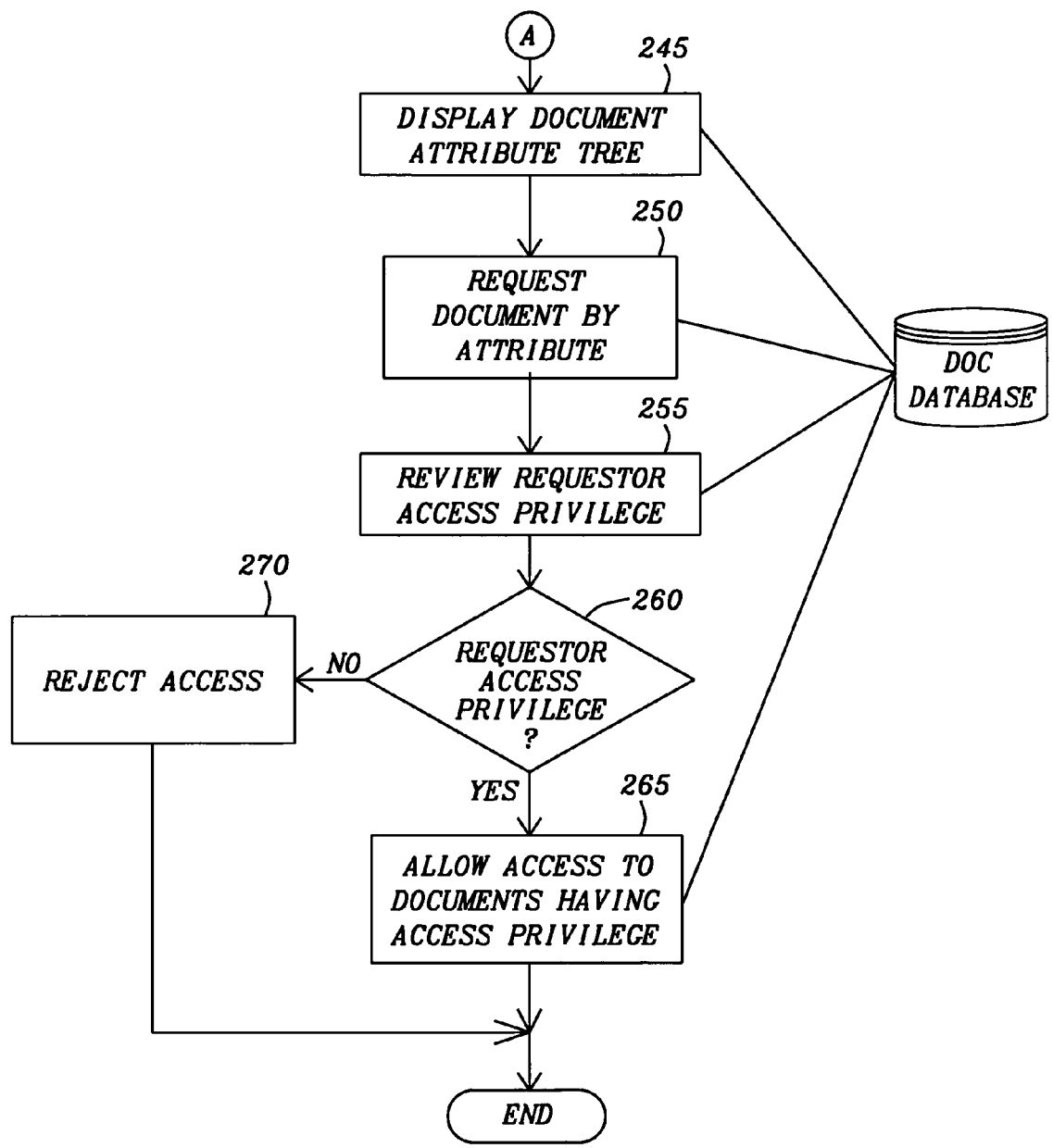
FIG. 5 is process flow diagram for document database management illustrating the granting or denying of access privileges for documents based on the access privileges associated with the attributes of a document within the document database

In FIG. 4, document bodies are retained within the document database 240 with a document basic information records provides the information describing the document such as the document number, the document version, document phase of creation, the document title, the effective duration for which the document is considered valid, the current status of the document, and the physical location within the database retention device of the document bodies. The originator of the documents and/or administrator of the document database 240 establishes (Box 200) attributes of the documents that are to be classified. The attributes for each document are assigned (Box 205). In programming languages such as XML, the tags are placed within each document with each tag containing the attribute descriptor for the attribute. Each attribute associated with a document is assigned a tree level (Box 210) which is placed in a tree level record associated with each attribute. Again in a programming language such as XML, a tag for the tree level would be created and associated with the attribute tag of the document. Once the attributes and tree level are assigned (Boxes 205 and 210), an access privilege record is created to assign (Box 215) an appropriate access level for the document. When a user or customer requests to retrieve a document or documents from the document database 250, a user profile is queried (Box 220) to determine if the user desires to modify the tree level of certain tree level for any of the attributes. If the tree levels of attributes are to be modified, the attribute tag is modified (Box 225) and the modification retained (Box 230). A hierarchical document category tree is built (Box 235) to catalog the document according to the document attributes.

The hierarchical document category tree is displayed (Box 245) for the user to review which documents are available for access from the document database 240. The hierarchical document category tree provides the attribute classifications by levels to facilitate review of the documents. The user requests (Box 250) a document according to the attribute from the hierarchical document category tree. The access privilege record is reviewed and compared (Boxes 255 and 260) to the access privileges granted to the user. If the user is granted access privileges, the user is allowed access (Box 265) to the selected documents so that they may be retrieved from the document database 240 and transferred to the user. If the user is not granted access privileges the access request is denied (Box 270) and the user cannot retrieve the documents.

The document management system and method of this invention as described provides a virtual hierarchical document category tree allowing generation of the document category tree based on the attributes of the documents. No permanent hierarchical document category tree needs to be maintained in the document database. The privilege access record controls the access rights of a document during the navigation of the hierarchical document category tree. Each time a hierarchical document category tree is modified, the access rights for the documents can be changed and controlled based on the attributes of the documents. Further, the ability of a user to modify the tree level record for any attribute of the documents of the database allows a personalizable and customizable hierarchical document category tree for each user.

The construction of the hierarchical document category tree permits the administrator of the document database to manage the database without the attention to the details of the hierarchical document category tree and having to maintain the individual access privileges of the users. This improves the flexibility of the access to the documents of the database and improves the security of the access by having the access privileges controlled within the system. Further, having an automatic generation of the hierarchical document category tree insures that as long as the attributes for a document are correct, there will be no miss-classification of the documents within the tree.

While this invention has been particularly shown and described with reference to the preferred embodiments thereof, it will be understood by those skilled in the art that various changes in form and details may be made without departing from the spirit and scope of the invention.

The invention claimed is:

1. A method for management of categorization and access to documents between a semiconductor foundry and a user, the method comprising the steps of:
    retaining within a document database body text for a plurality of documents that define parameters of the semiconductor foundry's manufacturing processes;
    creating a document identification record associated with each document of the plurality of documents;
    categorizing a plurality of document attributes for each document of the plurality of documents, each of the plurality of document attributes based on the parameters of the semiconductor foundry's manufacturing processes;
    creating an attribute record for each category of document attribute for each document of the plurality of documents;
    creating an attribute tree level record providing a hierarchy for each categorization defined by each attribute;
    defining a document access control record associated with each document of the plurality of documents identifying which of said document attributes govern access to said documents;
    creating a user access profile for a user, said user access profile defining the user's access privileges for each attribute;
    generating a document tree categorizing said documents based on attributes selected by the user;
    selecting at least one document from the document tree;
    comparing said user access profile to said document access control record for the at least one selected document; and
    transferring to a the user those documents selected by said user from said document tree and for which said user has access privileges granted based on the contents of said document access control record.

2. The method of claim 1 further comprising the step of:
    creating a user access profile for said user, said user access profile defining access privileges for each attribute of each of the plurality of documents.

3. The method of claim 2 further comprising the steps of:
    comparing said user access profile to said document access control record; and
    determining that those documents selected by said user are transferable to said user.

4. The method of claim 3 further comprising the steps of:
    modifying by said user, said hierarchical categorization of any attribute; and
    retaining a modified attribute tree level record within said user access profile established for said user.

5. A computer readable medium having program code stored thereon for managing user access to a plurality of documents retained within a document database of a semiconductor foundry, the program code executing on a computer performs the steps comprising:
    retaining within a document database body text for a plurality of documents that define parameters of the semiconductor foundry's manufacturing processes;
    creating a document identification record associated with each document of the plurality of documents;
    categorizing at least one document attribute for each document of the plurality of documents, the categorizing at least partially based on the parameters of the semiconductor foundry's manufacturing processes;

creating an attribute record for each category of document attribute for each document of the plurality of documents;

creating an attribute tree level record providing a hierarchy for each categorization defined by each attribute;

defining a document access control record associated with each document of the plurality of documents identifying which of said document attributes govern access to said documents;

creating a user access profile for a user, said user access profile defining the user's access privileges for each attribute;

generating a document tree categorizing said documents based on attributes selected by the he user;

selecting at least one document from the document tree;

comparing said user access profile to said document access control record for the at least one selected document; and transferring to the user those documents selected by said user from said document tree for which said user has access privileges granted based on comparing said user access profile to said document access control record.

6. The computer readable medium of claim 5 wherein said instructions further comprise:

modifying by said user, said hierarchical categorization of any attribute; and retaining a modified attribute tree level record within said user access profile established for said user.

7. A computer implemented document management system for use between a semiconductor foundry and a plurality of semiconductor designers, the document management system comprising:

a document database comprising:

a plurality of documents defining parameters of the semiconductor foundry's manufacturing technologies, a document identifier associated with each of the plurality of documents, a plurality of attributes corresponding to a set of predetermined attribute types associated with each of the plurality of documents, the set of attribute types including a document type, a technology application, a minimum feature size, and a release status, a modifiable attribute tree for providing a hierarchical categorization of the documents based on specific attributes selected from the set of attributes by a semiconductor designer, a document access control record associated with each of the plurality of documents, the document access control record identifying the attributes of the document that govern access to the document, and a user access profile associated with each of the plurality of semiconductor designers, the user access profile defining access privileges for each of the plurality of semiconductor designers for each of the plurality of attributes; and a control system in communication with the document database and accessible by each of the plurality of semiconductor designers, the control system allows each of the plurality of semiconductor designers access to the document database such that the semiconductor designer can select the specific attributes for defining the attribute tree and retrieve those documents for which the access privileges of the semiconductor designer granted access based on comparing said user access profile to said document access control record.

8. The document management system of claim 7 wherein said document database further comprises a user preference profile associated with each of the plurality of semiconductor designers, the user preference profile retaining the last grouping of specific attributes selected by the semiconductor designer for defining the modifiable attribute tree.

* * * * *